United States Patent Office 3,769,267
Patented Oct. 30, 1973

3,769,267
PROCESS FOR POLYMERIZATION OF
CONJUGATED DIENES
Tai Chun Cheng, Mogadore, and Adel F. Halasa, Bath, Ohio, assignors to The Firestone Tire & Rubber Company, Akron, Ohio
No Drawing. Filed Feb. 16, 1971, Ser. No. 115,711
Int. Cl. C08d 1/32, 3/08; C08f 19/08
U.S. Cl. 260—83.7         16 Claims

ABSTRACT OF THE DISCLOSURE

Conjugated dienes are polymerized by a new catalyst system which permits control of the molecular weight and gives a more easily processed product. This catalyst system comprises (1) an alkali metal, namely Li, Na, K, Cs and Rb, modified with (2) an alkoxide of K, Na and Li, in which the alkoxide has 1–10 carbon atoms. The diene polymers produced by this process have controllable molecular weights in the range of 5,000–1,000,000, preferably 100,000–500,000, broad molecular weight distribution, glass transition temperatures higher than normally obtained, a high degree of branching, and are more easily processed in the production of rubber and other compositions for commercial use.

BACKGROUND OF THE INVENTION

Field of the invention

This invention relates to a process for the polymerization of dienes using a catalyst composition comprising an alkali metal modified with a sodium, potassium or lithium alkoxide.

Related prior art

The polymerization of conjugated dienes can be effected in a variety of methods. However, there are various disadvantages in the various methods presently known, including undesirable properties in the products, such as lack of control of molecular weight and molecular weight distribution, and poor processability of the polymer. For example, alkali metals by themselves give very low molecular weight polymers which are not practical for use in tire rubber compositions. Moreover, these metals cannot be used in polymerizations in hexane or similar solvents due to their slow rates of polymerization. If polar solvents are used, these metals give very low molecular weights unless extremely low temperatures are used, which low temperatures are very impractical.

Sodium metal may be used to give high molecular weights if the polymerizations are conducted in bulk or in vapor phase over a very long period. However the 60 hours to several weeks required is very impractical for commercial production.

Sodium alkyls by themselves give very low molecular weight polymers. When modified with lithium or potassium t-alkoxides, much higher molecular weights are obtained. However the sodium alkyls are relatively expensive for commercial purposes as compared with sodium metal.

Lithium alkyls give very narrow molecular weight distribution, low vinyl content, poor processibility and difficulty in broadening the molecular weight range. When modified with polar solvents, although the vinyl content is increased, the processability is still poor and the molecular weight distribution is still narrow. Lithium alkyl is also relatively expensive for commercial purposes.

The so-called "Alfin" catalyst system which has been studied extensively produces diene polymers of approximately 5,000,000 molecular weight, or even higher, which polymers are difficult to process for commercial use. Such a catalyst system generally comprises allyl sodium, sodium isopropoxide and sodium chloride.

Polybutadienes prepared by the use of n-butyl lithium in n-hexane have about 8–10% 1,2, 53–54% trans-1,4 and 35–37% cis-1,4 configurations, which polymers do not have enough 1,2 configuration for desired properties. By using polar modifiers or solvents, such as ethers, amines, etc., the vinyl content can be increased up to 50–70%. However the molecular weight distribution in such cases is so narrow as to give poor processability. Processability is very important for commercial rubber tire production. Among other disadvantages, poor processability results in poor adhesion to fillers and thereby gives poor reinforcement. Moreover, the polar modifiers act as chain terminators and prevent active polymer products that might be joined or otherwise post-treated to improve processability.

SUMMARY OF THE INVENTION

In accordance with the present invention, it has now been found that conjugated diene polymers of controllable molecular weight, broad molecular weight distribution, good processability, high glass transition temperatures and good wet traction are produced by the use of a catalyst system which is much less expensive than the systems involving alkali metal alkyls, such as n-butyl lithium or n-butyl sodium. This catalyst composition comprises the combination of an alkali metal such as Li, Na, K, Cs and Rb, modified with an alkoxide of Li, Na or K, which alkoxide preferably has 1–10 carbon atoms.

Reference to alkoxides is used in a generic sense in that it includes various hydrocarbon oxides, namely alkoxides per se, alkenyloxides, aryloxides, aralkoxides, alkaryloxides, cycloalkyloxides, cycloalkenyloxides and the like.

Typical alkoxides that may be used in the catalyst combination include the following alkoxides of lithium, sodium and potassium: methoxide, ethoxide, propoxide, allyloxide, butoxide, 2-butenyloxide, amyloxide, methallyloxide, hexoxide, heptoxide, octoxide, nonoxide, decoxide, cyclohexoxide, cycloheptoxide, phenoxide, naphthoxide, benzoxide and the like. The alkoxide may be either primary, secondary or tertiary.

The alkoxide may be prepared in situ by the reaction of the corresponding alkali metal with the alcohol which will provide the desired alkoxy group. However the amount of alcohol used should be equivalent to the amount of alkoxide desired in the ultimate catalyst composition. If excess alcohol is used, it will also react with at least a portion of the alkali metal which is to be the other component in the catalyst system.

In the catalyst combination, the system is the most active when there are 0.05–2, preferably 0.2–1.0 moles of the metal alkoxide per atom of the alkali metal. Higher ratios are not necessary and have no added effect.

The catalyst can be prepared at room temperature or even slightly above. However, it is preferably prepared at 0° C. or even lower.

The combined catalyst is used in a proportion of 0.1–10 millimoles, preferably 0.5–2 millimoles of catalyst combination per 100 grams of monomer. Moles of catalyst combination are determined by the number of moles or atoms of the component present in the lesser equivalent amount.

The polymerization temperature is advantageously no higher than 200° C. and is preferably no higher than 130° C. While higher temperatures can be used, even as high as 250° C., increasing temperatures cause decreasing molecular weights. The minimum temperature is 0° C., preferably at least 30° C.

Polybutadienes produced at temperatures of 30° C. or lower have molecular weights as 6,000,000. Generally at 30–130° C. the molecular weights are 100,000 to 6,000,000. At 200° C. molecular weights of 20,000–50,000 are obtained. The molecular weights vary somewhat according to catalyst concentration.

Yields as high as 98–99% are easily produced. The 1,2 configuration in the polymer is at least 35% and generally is in the range of 35–50% when the temperature does not exceed 30° C. At 130° C. it is about 35–40%, and at 0° C. as high as 70%.

It has been found that desirable wet traction or skid resistance properties require at least 35%, 1,2 configuration in the polymers. In contrast, corresponding emulsion polymers, which have low glass transition temperatures (−55 to −59° C.), also may have poor wet traction properties. The emulsion polymers have 20–25% 1,2 configuration and 75–80% trans-1,4.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons, preferably of the straight chain variety such as n-hexane, n-heptane, etc. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either. Advantageously the polymerization temperature is no higher than 200° C., preferably no higher than 130° C., since the higher temperatures give lower molecular weights. At the higher temperature polymerization may be completed in 10 minutes, although it is generally preferred to polymerize at temperatures at which complete conversion is obtained in 2–4 hours.

Conjugated dienes that may be polymerized in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can also be used where the comonomers impart desirable properties and do not detract from the polymer properties. The comonomers are preferably olefins, such as butene-1, n-butene-2, isobutylene, n-pentene-1, n-pentene-2 and the like, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alpha-methyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, i-isopropenyl-5-chloro-naphthalene, vinyl diphenyl, vinyl diphenylethyl, 4-vinyl-4'-methyl-diphenyl, 4-vinyl-4'-chlorodiphenyl and the like. Preferably such comonomers have no more than 12 carbon atoms. Where such comonomers are to be used, generally at least 1%, preferably at least 5% by weight should be used, and as much as 60%, preferably no more than 30% may be used.

In referring above to millimoles of catalyst combination or complex, this corresponds to the millimoles of the alkoxide or milliatomic weight of the metal, whichever is present in the lesser equivalent amount.

The "dilute solution viscosity" referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration.

Reference to molecular weight herein is intended to mean average number molecular weight. This molecular-weight is based on the intrinsic viscosity and is determined according to the procedure described in the 1966 edition of "Polymer Handboook" edited by J. Brandrup and E. H. Immergut and published by Interscience Publishers, New York, pages IV–1 to IV–46, particularly pages IV–29 to IV–31.

SPECIFIC EMBODIMENTS OF INVENTION

The invention is illustrated by the following examples which are intended merely for purposes of illustration and are not to be regarded as limiting the scope of the invention or the manner in which it may be practiced. Unless specifically indicated otherwise, parts and percentages are given by weight.

Example I

Butadiene is solution polymerized (25% concentration in hexane) in a stainless steel, 1-gallon reactor using 0.34 gram of Na metal (1.74 mM.) per 100 grams of butadiene. The sodium is added as a 40% suspension in hydrocarbon oil, the metal having a particle size of about 1 micron. Polymerization is effected at a temperature of 30° C. for a period of three days. Conversion to polymer is about 10%, the molecular weight is about 30,000 (dilute solution viscosity of 0.8) with a broad molecular weight distribution, and the polymer has a vinyl content of 67.5%. The low molecular weight of the product, the low conversion and the very slow polymerization rate are very undesirable features of this type of polymerization.

Example II

The procedure of Example I is repeated using lithium metal in place of sodium. Polymerization for a week gives a product having a molecular weight of about 100,000, a vinyl content of about 9%, a narrow molecular weight distribution and a conversion of 100%. In addition to the disadvantages of the very slow polymerization rate, and the poor processibility resulting from the narrow molecular weight distribution, the results are erratic and difficult to duplicate consistently. This polymer shows undesirably high cold flow values.

Example III

The procedure of Example I is repeated using, in place of the sodium metal, 0.5 millimoles of n-butyl lithium per 100 parts of butadiene. A polymerization period of 18 hours gives a molecular weight of about 100,000, a vinyl content of about 9%, a narrow molecular weight distribution and a conversion of about 100%. In addition to the use of the relatively expensive catalyst, the narrow molecular weight distribution causes poor processibility. This polymer shows undesirably high cold flow values.

Example IV

The procedure of Example III is repeated using tetrahydrofuran as the solvent in place of the hexane and the temperature is lowered to 0° C. to give a broader molecular weight distribution and thereby improve the processibility. However this process still has the disadvantage of the relatively expensive n-butyl lithium as the catalyst, and the lower temperature is more expensive to maintain in commercial operation. Moreover, this product has an extremely high vinyl content (80–90%) and a glass transition temperature of −20 to −15, which makes the polymer unsuitable for low temperature applications.

Example V

The procedure of Example III is repeated using n-butyl sodium as the catalyst in place of n-butyl lithium. The product has a molecular weight of about 30,000. The procedure is repeated using an equimolar amount of lithium t-butoxide with the n-butyl sodium to obtain a product having a molecular weight of about 500,000 or higher.

Example VI

A Li·NaOt-Bu of mole per mole ratio is prepared by adding 0.2 gram mole of lithium as a 33.8% lithium dispersion in mineral oil, to a 2-liter 3-necked flask along with 100 ml. of purified hexane. The mixture is then cooled to —60° to —70° C. Then 19.2 g. of sodium t-butoxide in 500 ml. of hexane is added with extremely fast agitation. The reaction mixture is then gradually warmed up to room temperature and the resultant slurry transferred to a storage bottle for subsequent use. For preparing catalyst combinations of different ratios, the amount of soidum t-butoxide is varied accordingly. The millimoles of catalyst reported is based on the number of moles or atoms of lithium (or other zero valent metal) regardless of the number of moles of alkoxide associated with each atom of metal.

A 20–25% butadiene in hexane solution in an amount to give 62 g. of butadiene is charged to a 28 oz. moisture-free beverage bottle, which has been flushed with dry nitrogen. This is crown capped with a cap having an opening therein covered with a thin sheet of rubber amount has an innerlining of aluminum foil. The desired amount of Li·NaOt-Bu is then added with a hypodermic syringe under 25 pounds of nitrogen pressure. The bottle is then immersed in a constant temperature bath maintained at the desired polymerization temperature. After the appropriate reaction time (3 to 6 hours) the resultant polymer is collected by pouring the reaction mixture into a large amount of methanol containing two ml. of antioxidant, collecting the precipitate, drying and weighing. The various conditions and results are tabulated below:

| Millimoles[1] Li·NaOt-Bu per 100 parts butadiene | Polymerization | | Percent of— | | DSV | Glass transition temp., °C. | Percent 1,2- |
|---|---|---|---|---|---|---|---|
| | Temp., °C. | Hours | Conversion | Gel | | | |
| 9.05 | 5 | 6 | 0 | | | | |
| 3.15 | 30 | 3 | 100 | 0 | 4.47 | —55 | 56.5 |
| 2.25 | 50 | 2 | 100 | 0 | 5.32 | —66 | 46.0 |
| 2.25 | 80 | 1 | 100 | 0 | 4.77 | —70 | 41.5 |

[1] As the temperature is increased the number of millimoles of cataylst is decreased to keep the molecular weight about the same.

This catalyst combination gives polymers of 600,000–800,000 molecular weight (DSV about 5), 100% conversions at temperatures of 30° C. or more, fast polymerization rates (3–4 hours at room temperature), and the polymerization can be run at temperatures as high as 100° C.

Example VII

A series of polymerizations are conducted according to the procedure of Example VI using lithium t-butoxide modified with metallic sodium (zero valent sodium). In each case a 20% solution of butadiene in n-hexane is used with 2.23–2.34 millimoles of the catalyst combination being used per 100 parts of butadiene. The proportion of lithium t-butoxide per atom of sodium is modified as indicated in the table below. The polymerization is conducted at 30° C. (86° F.) for a period of 3 hours. In each case 100% conversion is obtained to give a high molecular weight polymer (DSV 5.27–6.51) with 0% gel, good green strength, good properties when extended with oil, and various other advantageous properties as indicated in the table below.

| No. | Catalyst | mM. per 100 parts BD | Polymerization | | Percent conversion | DSV | Glass transition temp., °C. | Percent 1,2- |
|---|---|---|---|---|---|---|---|---|
| | | | Temp., °C. | Hours | | | | |
| (A) | Na·LiOtBu | 2.34 | 30 | 3 | 100 | 5.27 | —55 | 56.8 |
| (B) | Na·1/2 LiOtBu | 2.23 | 30 | 3 | 100 | 6.17 | —57 | 56.4 |
| (C) | Na·1/4 LiOtBu | 2.27 | 30 | 3 | 100 | 5.54 | —57 | 56.6 |
| (D) | Na·1/16 LiOtBu | 2.27 | 30 | 3 | 100 | 6.54 | | 60.4 |

Example VIII

The procedure of Example VII is repeated a number of times using the Na·LiOtBu catalyst with a variety of temperatures, decreasing the millimoles of catalyst with increasing temperature to produce approximately the same molecular weight. The conditions and results are tabulated below:

| No. | mM. per 100 parts BD | Polymerization | | Percent conversion | DSV | Glass transition temp., °C. | Percent 1,2- |
|---|---|---|---|---|---|---|---|
| | | Temp., °C. | Hours | | | | |
| (A) | 6.9 | 5 | 3 | 100 | 4.05 | —44 | 69.0 |
| (B) | 2.34 | 30 | 3 | 100 | 5.27 | —55 | 56.8 |
| (C) | 1.14 | 50 | 3 | 100 | 6.17 | —66 | 46.0 |
| (D) | 0.57 | 70 | 3 | 100 | 6.09 | —73 | 40.9 |
| (E) | 0.565 | 110 | 3 | 100 | 2.80 | —73 | 38.0 |

This catalyst gives high molecular weight polymers, generally of good processability and of good green strength, at fast rates and high conversion and can be used at any desirable temperature (—10° to 150° C.).

Example IX

The procedure of Example VI is repeated a number of times using as the catalyst a combination of sodium metal and potassium t-butoxide in a mole per mole ratio, varying the temperature as indicated below, and with the results indicated in the table. This catalyst (Na·KOtBu) combination allows the production of high molecular weight polymers (DSV 2–3), high conversion, fast rates of polymerization (2–3 hours at room temperature), and temperatures as high as 60° C. can be used.

| No. | mM. | Polymerization | | Percent of— | | DVS | Glass transition temp., °C. | Percent 1,2- |
|---|---|---|---|---|---|---|---|---|
| | | Temp., °C. | Hours | Conversion | Gel | | | |
| (A) | 3.47 | 5 | 3 | 100 | 0 | 2.19 | —55 | 56.5 |
| (B) | 0.69 | 30 | 3 | 100 | 0 | 2.28 | —63 | 47.5 |
| (C) | 0.34 | 50 | 3 | 100 | 0 | 1.34 | —69 | 42.5 |
| (D) | 0.692 | 80 | 3 | | | | —73 | 38.9 |

Example X

The procedure of Example VI is repeated a number of times using as the catalyst combination potassium metal and lithium t-butoxide. Various temperatures are used and the results are given in the table below. This catalyst combination produces high molecular weight polymers (DSV about 3–4) and high conversion, extremely fast rate (10 minutes at 80° C.), good green strength and can be run at temperatures as high as 150° C. The results are given in the table below.

| Catalyst | mM. | Polymerization Temp., °C. | Mins. | Percent of Conversion | Gel | DSV | Glass transition temp., °C. | Percent 1,2- |
|---|---|---|---|---|---|---|---|---|
| KiLiOtBu | 0.97 | 27 | 60 | 100 | 0 | 2.26 | −62 | 46.5 |
|  | 0.32 | 80 | 10 | 100 | 0 | 3.29 | −76 | 33.0 |
|  | 0.151 | 110 | 5 | 100 | 0 | 4.19 | −82 | 30.6 |

Example XI

The procedure of Example VI is repeated a number of times using as the catalyst combination lithium metal and potassium t-butoxide in a mole per mole ratio (Li·KOtBu)

This catalyst combination produces high molecular weight polymers (DSV about 5–7), vinyl content of 35–45%, high conversion and fast rates (3–4 hours at room temperature), and can be run as high as 100° C.

Example XIII

The procedure of Example VII is repeated a number of times using in place of the butadiene a mixture of butadiene and isoprene in the ratio of 80–20 respectively, using temperatures of 30° and 50° C. respectively with the Na·LiOtBu catalyst. The results are given in the table below.

| Identification | (A) | (B) | (C) | (D) | (E) | (F) |
|---|---|---|---|---|---|---|
| Butadiene, parts | 80 | 80 | 80 | 80 | 80 | 80 |
| Isoprene, parts | 20 | 20 | 20 | 20 | 20 | 20 |
| mM. catalyst per 100 parts monomer | 2.3 | 1.3 | 1.9 | 2.1 | 1.3 | 0.84 |
| Polymerization temp., °C | 30 | 50 | 50 | 50 | 70 | 110 |
| DSV | 5.24 | 4.76 | 4.34 | 4.40 | 2.44 | 3.40 |
| Glass transition temperature ($T_g$ °C.) | −53 | −58 | −57 | −58 | −64 | −69 |
| Percent 1, 2 (in BD) | 59.9 | 51.7 | −9.5 | | 42.8 | 37.4 |
| Percent 3, 4 (in isoprene) | 58.7 | 57.0 | 52.8 | | 48.2 | 46.9 |
| Percent isoprene | 21.9 | 23.8 | 25.5 | | 21.7 | 22.2 |

EXAMPLE XIV

The various copolymer rubbers of Example XIII are compounded with a natural rubber and a styrene butadiene copolymer rubber and tested as a tire body stock with the following results which show that a substantial portion of the more expensive nitrile and styrene-butadiene copolymer rubbers may be replaced in substantial proportion by the more economical rubber of this invention.

|  | (A) | (B) | (D) |
|---|---|---|---|
| Experimental rubber: |  |  |  |
| NR (parts) | 25 | 25 | 25 |
| SBR (parts) | 25 | 25 | 25 |
| Experimental rubber (parts) | 50 | 50 | 50 |
| Brabender Scorch at 275° F.: |  |  |  |
| Min. torque M.G | 1,575 | 1,550 | 1,525 |
| Torque rise, min | 12.0 | 13.7 | 11.5 |
| Scorch, min | 17.0 | 17.1 | 16.0 |
| Instron wind-up tack; lb./in. average | 1.8 | 2.0 | 1.6 |
| Green stress strain: |  |  |  |
| Peak, lbs | 4.6 | 4.2 | 43. |
| Break, lbs | 0.1 | 0.2 | 0.2 |
| Percent elongation | 800 | 662 | 762 |
| ML/4/212° F.; compound | 89.0 | 80.0 | 80.0 |
| Normal stress-strain 300° F. cure, 300% Modulus, p.s.i.: |  |  |  |
| 15' | 250 | 275 | 1,275 |
| 25' | 2,075 | 2,275 |  |
| 45' |  |  |  |
| Tensile strength, p.s.i.: |  |  |  |
| 15' | 700 | 700 | 2,250 |
| 25' | 2,150 | 2,500 | 2,000 |
| 45' | 2,000 | 2,100 | 2,125 |
| Ultimate elongation, percent: |  |  |  |
| 15' | 610 | 600 | 480 |
| 25' | 310 | 330 | 260 |
| 45' | 270 | 270 | 280 |
| Shore A Hardness on rebound bulk cure, 30/300° F | 61.0 | 62.0 | 62.0 |
| Steel ball rebound on rebound bulk cure, 30/300° F.: |  |  |  |
| Percent at 73° F | 37.0 | 41.0 | 40.0 |
| Percent at 212° F | 70.5 | 71.0 | 70.5 |

Example XV

A variety of polymers from Examples VII, XII and IX are tested as tire stock with the results tabulated below. Wet traction and processability characteristics are also very good.

| Polymer | VIIA | VIIB | XIIB | XIIA | VIIC | IXB |
|---|---|---|---|---|---|---|
| Cepar rapid extrusion at 240° F., width/length percent | 69.2 | 56.4 | 70.0 | 54.8 | 59.2 | 63.5 |
| CEPAR relative modulus cure curve at 300° F. (min.): |  |  |  |  |  |  |
| Scorch | 4.3 | 5.0 | 4.6 | 4.3 | 4.6 | 4.6 |
| Cure start | 8.1 | 8.5 | 8.6 | 10.1 | 7.9 | 11.9 |
| 20% cure | 8.8 | 9.8 | 9.1 | 10.7 | 8.7 | 12.5 |
| 50% cure | 10.2 | 12.6 | 10.1 | 11.9 | 10.4 | 13.8 |
| 90% cure | 14.9 | 22.2 | 13.6 | 16.0 | 16.1 | 18.4 |
| 95% cure | 17.0 | 26.4 | 15.1 | 17.8 | 18.6 | 20.3 |
| Cure constant (K) | .34 | .168 | .464 | .392 | .280 | .354 |
| Deflection difference | 22.8 | 25.8 | 42.3 | 51.0 | 21.0 | 36.7 |
| Normal stress-strain properties cured at 300° F., 300% modulus, p.s.i.: |  |  |  |  |  |  |
| 15' | 600 | 525 | 600 | 650 | 650 | 225 |
| 23' | 975 | 925 | 775 | 800 | 1,100 | 700 |
| Tensile, p.s.i.: |  |  |  |  |  |  |
| 15' | 2,350 | 2,675 | 2,200 | 2,325 | 2,900 | 1,150 |
| 33' | 2,800 | 2,350 | 2,300 | 2,400 | 2,675 | 2,475 |
| Elongation percent: |  |  |  |  |  |  |
| 15' | 640 | 760 | 720 | 710 | 700 | 770 |
| 23' | 550 | 520 | 620 | 630 | 510 | 670 |
| Steel ball rebound cured 35' at 300° F.: |  |  |  |  |  |  |
| Percent at 73° F | 31.0 | 33.0 | 11.0 | 7.0 | 33.0 | 33.0 |
| Percent at 212° F | 51.0 | 54.0 | 63.0 | 34.0 | 52.0 | 45.0 |
| Shore A hardness cured 35' at 300° F.: |  |  |  |  |  |  |
| At 73° F | 54.0 | 56.0 | 51.0 | 39.5 | 56.0 | 54.0 |
| At 212° F | 47.0 | 51.0 | 41.0 | 32.0 | 51.0 | 46.0 |
| Young's bending modulus cured 30' at 300° F.: Index at 10,000 p.s.i., °C | −34 | −43 | −28 | −24.4 | −45.8 | −45 |
| Stanley-London wet skid resistance cured 30' at 300° F., index | 104.5 | 102 | 116 | 121 | 102 | 98.5 |

The catalyst combinations of this invention give very high polymerization rates, give very high molecular weights of polymer, give very high conversion, and can be used in solution polymerization. While the molecular weights may be very high, they can be controlled so as to give reasonable molecular weights for easy processing by the use of practical temperatures, namely —10 to 150° C. The elastomer products have very desirable properties and are highly branched, easily processed, have high green strength and high vinyl contents. The polymers of this invention have the advantage of producing excellent wet traction properties when embodied in tire compositions. Moreover, these catalyst compositions are very economical and are much less expensive than other catalysts such as butyl lithium, etc., presently used commercially for butadiene polymerization.

While certain features of this invention have been described in detail with respect to various embodiments thereof, it will, of course, be apparent that other modifications can be made within the spirit and scope of this invention and it is not intended to limit the invention to the exact retails shown above except insofar as they are defined in the following claims.

The invention claimed is:

1. A process for the polymerization of a monomer composition selected from the class consisting of 1,3-butadiene and mixtures of said butadiene and styrene containing at least 70 percent of said butadiene comprising the steps of maintaining the said monomer composition at a temperature of no more than 200° C. in intimate contact with a catalyst composition consisting essentially of:
    (a) an alkali metal selected from the class consisting of lithium, sodium, potassium, cesium and rubidinum, and
    (b) an alkali metal alkoxide of no more than 10 carbon atoms, and selected from the class consisting of potassium, sodium and lithium alkoxides,
the concentration of said catalyst composition being 0.1–10 millimoles of combined catalyst per 100 grams of said monomer composition, and said alkoxide being present in said catalyst composition in a ratio of 0.05–2 moles per atom of said alkali metal, said polymerization being conducted for a period of at least ten minutes.

2. The process of claim 1 in which said temperature is no more than 130° C.

3. The process of claim 2 in which said conjugated diene is 1,3-butadiene.

4. The process of claim 2 in which said monomer composition is essentially all 1,3-butadiene.

5. The process of claim 4 in which said alkoxide is lithium alkoxide.

6. The process of claim 5 in which said alkali metal is sodium.

7. The process of claim 4 in which said alkoxide is sodium tertiary-butoxide.

8. The process of claim 7 in which said alkali metal is lithium.

9. The process of claim 8 in which said ratio of moles of alkoxide per atom of metal is 0.2–1.

10. The process of claim 9 in which said polymerization is conducted in n-hexane solution.

11. The process of claim 10 in which said monomer is in n-hexane solution at a concentration of 10–25 percent by weight.

12. The process of claim 1 in which said catalyst composition is present at a concentration of 0.2–1.0 millimoles per 100 grams of said monomer.

13. The process of claim 1 in which said monomer composition is dissolved in a liquid hydrocarbon having a boiling point no higher than 100° C.

14. The process of claim 13 in which said monomer composition is present at a concentration of 10–25 percent by weight.

15. The process of claim 14 in which said liquid hydrocarbon is n-hexane.

16. The process of claim 2 in which said monomer composition contains 5–30 percent by weight styrene.

References Cited
UNITED STATES PATENTS 3,644,313   2/1972   Cheng et al. _____ 260—94.2 M JAMES A. SEIDLECK, Primary Examiner U.S. Cl. X.R.

260—94.2 T

UNITED STATES PATENT OFFICE
CERTIFICATE OF CORRECTION

Patent No. 3,769,267      Dated October 30, 1973

Inventor(s) Tai Chun Cheng and Adel F. Halasa

It is certified that error appears in the above-identified patent and that said Letters Patent are hereby corrected as shown below:

Col. 3, line 2, immediately following the word "weights" and before the word "as" insert the words --as high--.

Col. 7, Line 46, under Column (C), "-9.5" should read --49.5.

Col. 8, line 28, under Column (D), "43." should read --4.3--.

Col. 9, line 22, "retails" should read --details--.

Col. 9, line 33, "rubidinum" should read --rubidium--.

Signed and sealed this 12th day of March 1974.

(SEAL)
Attest:

EDWARD M. FLETCHER, JR.       C. MARSHALL DANN
Attesting Officer      Commissioner of Patents